United States Patent [19]

Mei Sue

[11] Patent Number: 4,579,745
[45] Date of Patent: Apr. 1, 1986

[54] PROCESS AND AN APPARATUS FOR FORMING A CUP-SHAPED SKIN FOR A SKIN-ENVELOPED FOOD

[76] Inventor: Woo Mei Sue, Suzuki Bldg. Rm. 302, No. 543-1, Kitano-cho, Hachioji-shi, Tokyo, Japan

[21] Appl. No.: 670,119

[22] Filed: Nov. 9, 1984

[30] Foreign Application Priority Data

Nov. 10, 1983 [JP] Japan ................................ 58-211465

[51] Int. Cl.⁴ .......................... A21C 3/04; A21C 11/10
[52] U.S. Cl. .................................... 426/512; 264/163; 425/298; 425/412; 425/444; 426/503
[58] Field of Search ...................... 426/512, 138, 503; 425/298, 310, 311, 383, 412, 438, 444, 436 R; 264/292, 163; 99/430, 428

[56] References Cited

U.S. PATENT DOCUMENTS 3,489,829  1/1970  Lipfert ................ 264/163

FOREIGN PATENT DOCUMENTS 603266   6/1948  United Kingdom ................ 425/298
2071561A 9/1981  United Kingdom ................ 425/412

*Primary Examiner*—George Yeung
*Attorney, Agent, or Firm*—Young & Thompson

[57] ABSTRACT

A process and apparatus for forming a cup-shaped skin for a skin-enveloped food, in which a dough strip of predetermined width and thickness and a suitable extensibility is extruded through a hole of a plate by an inverted frusto-conical or pyramidal die. The extruded dough envelope is received on a vertically displaceable lifting plate of a shaping cup, where stuffing and sealing of the dough envelope may then be performed. The extruding die and the hole of the plate are so dimensioned that the resulting dough envelope will have a thickness gradient which tapers from a thicker central base portion to a thinner peripheral upper portion.

2 Claims, 10 Drawing Figures

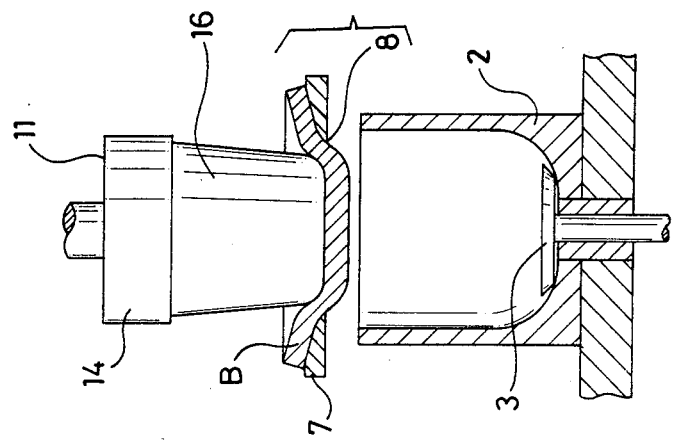
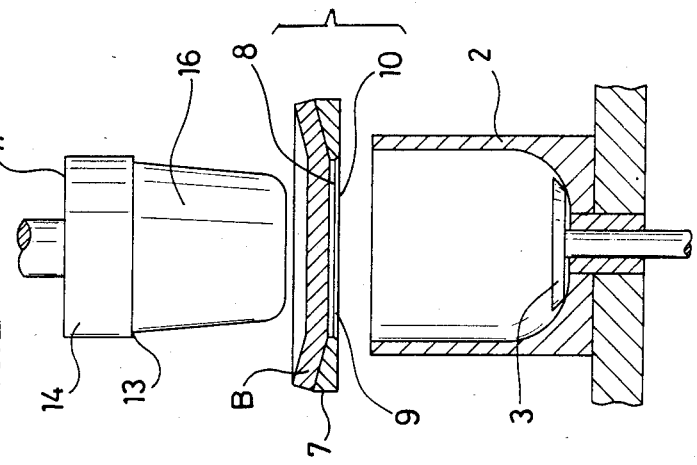
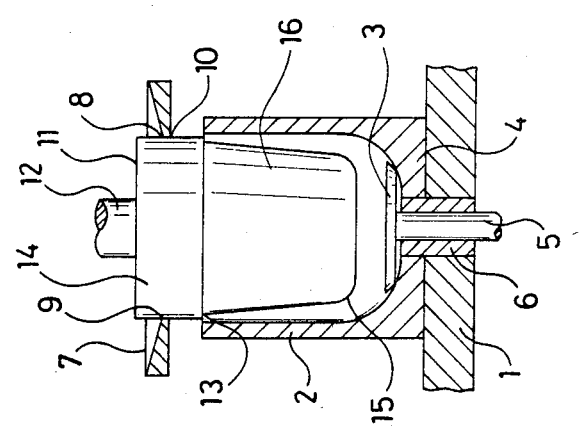

PROCESS AND AN APPARATUS FOR FORMING A CUP-SHAPED SKIN FOR A SKIN-ENVELOPED FOOD

A process of forming a cup-shaped skin for a skin-enveloped food is disclosed, in which a dough strip is placed on a plate having a predetermined width and a suitable extensibility and then the strip is extruded from a hole of the plate by means of a special shaping device to form the cup-shaped skin having a thickness gradient of thinning from its bottom to top, thereafter the cup-shaped skin is cut apart by a cutting edge of the shaping device in cooperation with the hole of the plate, which cup-shaped skin thus cut apart is then plated onto a lift plate within a shaping cup.

An apparatus for embodying the above process is also disclosed.

FIELD OF THE INVENTION

This invention relates to a process and an apparatus of forming a cup-shaped skin for a skin-enveloped food, such as Chinese manju, gyoza and the like, containing cooked meat with vegetable therein.

BACKGROUND OF THE INVENTION

Heretofore, such types of skin-enveloped foods have been prepared manually or mechanically. When prepared manually, an amount of dough enough for forming a single envelope is torn off and pressed into a flat dough by a palm, which dough in turn is extended by a rod into a skin disk of a thick center with a thin periphery. Thereafter, the skin disk at its center is filled with cooked food and is pulled together at its periphery to form a cup-shaped skin, which at its peripheral area is provided with a beautiful pattern, such as flowers or the like. However, the manual procedure cannot produce constant and flexible dough skins having extensibility of high quality rapidly and simply in a large amount. When prepared mechanically, on the other hand, the dough must be rolled by rollers into dough strips of uniform thickness, which are low in water content and extensibility. This means that the flexible skins of high quality cannot be obtained. Thus, when the skin is provided with cooked food and pulled together at its periphery into the cup-shaped skin, the peripheral area becomes more thick relative to a center area, which means that the thick peripheral area is difficult in cooking and thus unpalatable. Further, the peripheral area cannot be provided with a beautiful pattern, such as flowers, so that its appearance is not preferable.

An object of the invention is to provide a process of forming the cup-shaped skin for the enveloped food, which may solve the problems as described above.

Another object of the invention is to provide an apparatus for embodying the process of the invention.

SUMMARY OF THE INVENTION

In accordance with the invention, in one aspect, there is provided a process of forming a cup-shaped skin for a skin-enveloped food, which comprises the steps of:

placing on a plate a flexible dough strip having a predetermined width and an appropriate extensibility, extruding the dough strip downwardly from a hole of said plate by means of a lower shaping part having an inverted conical or pyramidal form of a shaping device for the cup-shaped skin, thereby to form the cup-shaped skin having a thickness gradient of gradually thinning from its bottom to top due to a gap difference between the hole and the shaping part and due to the extensibility of the dough strip, cutting apart the cup-shaped skin by crossing an upper cutting edge of the shaping device with the hole of the plate, and placing the cup-shaped skin thus cut apart onto a lift plate within a shaping cup.

In another aspect of the invention, there is provided an apparatus for embodying the above process of the invention, which comprises;

a shaping cup, a lift plate supported on a base of the shaping cup so as to be vertically movable, and a plate arranged above the shaping cup for placing a dough strip, said plate having a center portion deprived slightly of a peripheral edge which portion is provided with a hole slightly smaller than an inner diameter of the shaping cup, as well as a shaping device for the cup-shaped skin arranged above said plate, comprising an upper cutting edge having an outer diameter slightly smaller than an inner diameter of the hole and a lower shaping part in an inverted conical or pyramidal form having an outer diameter at its upper end slightly smaller than the outer diameter of the cutting edge, said shaping part being vertically movable to be fitted into the shaping cup through the hole of the strip-placing plate.

The invention will be described for its non-limiting embodiments with reference to the accompanying drawings.

BRIEF DESCRIPTION OF THE DRAWINGS

FIG. 1 is a vertical sectional view of an apparatus for forming a cup-shaped skin according to the invention;

FIGS. 2 to 7 show a procedure of forming the cup-shaped skin, in which FIG. 2 shows a position of placing a dough strip on a plate, FIG. 3 shows a position of extruding the dough strip downwardly, FIG. 4 shows a half-extruded position, FIG. 5 shows a position of cutting the dough strip with inner and outer edges, FIG. 6 shows a completely extruded position of forming the cup-shaped skin, and FIG. 7 shows a finished cup-shaped skin;

PREFERRED EMBODIMENTS OF THE INVENTION

Figure 4:
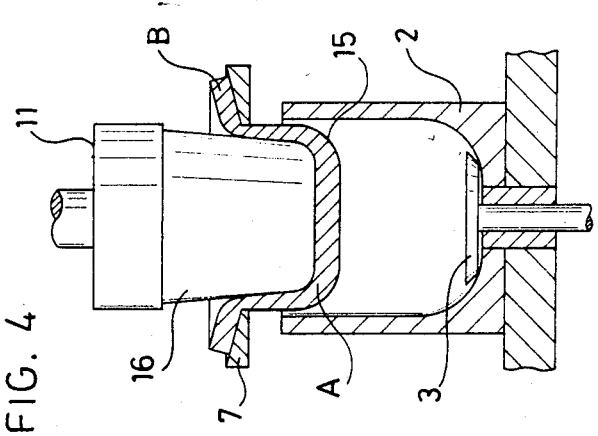
Figure 5:
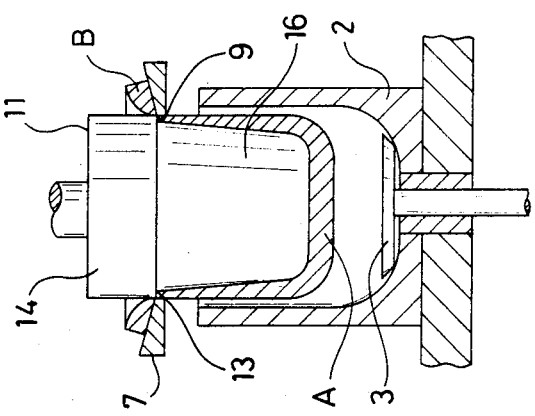

Referring to FIG. 1, on a supporting base 1 is arranged a shaping cup 2 with its inner surface coated with Tefron, on a bottom 4 of which cup is supported a lift plate 3 with its upper surface coated also with Tefron. The lift plate 3 is vertically movable by a shaft 5 on a bearing 6 passing through the supporting base 2 and the bottom 4 of the shaping cup 2. Above the shaping cup 2 is arranged a circular plate 7 coated with Tefron for placing a dough strip. The plate 7 is provided at its central area sloping inwardly and downwardly with a circular hole 8 of a size slightly smaller than an inner diameter of the shaping cup 2. The hole 8 is tapered (at about 10° angle) from a thick outer periphery to a thin inner periphery which is provided vertically with an inner edge 9 of a suitable thickness (preferably about 2 mm). Further, under the inner periphery of the hole 8 is provided a tapered portion 10 for preventing return of the dough strip. Above the plate 7 is arranged a shaping device 11 for the cup-shaped skin with its surface coated with Tefron. The shaping device 11 at its lower shaping part (as described hereinafter) is passed through the hole 8 of the plate 7 and is vertically movable through a shaft 12 to be fitted into the shaping cup 2. The shaping device 11 is shaped in a cylinder form having an outer diameter slightly smaller than an inner diameter of the hole, and comprises an upper cutting portion 14 having a perpendicular outer edge 13 on the lower periphery and a lower skin-shaping part 16 having at its lower periphery a rounded portion 15. The shaping part 16 is shaped in a substantially inverted conical or pyramidal form having an outer diameter at its upper end smaller than an outer diameter of the cutting portion 14.

While the shaping part 16 is described herein as having the inverted conical or pyramidal form, it is not limited thereto but may have an elliptical, a gourd-like a D-shaped or a polygonal cross-section. Of course, in these cases, the shaping cup 2, the hole 8 of the plate 7 and the cutting edge 14 may have a shape corresponding to the shape of the shaping part 16. In case of the circular cross-section, the shaping part 16 is suitable for the Chinese manju and the like, while the elliptical cross-section is suitable for the gyoza and the like.

A procedure for forming the cup-shaped skin A will now be described hereinbelow with reference to FIGS. 2 to 7.

Figure 6:
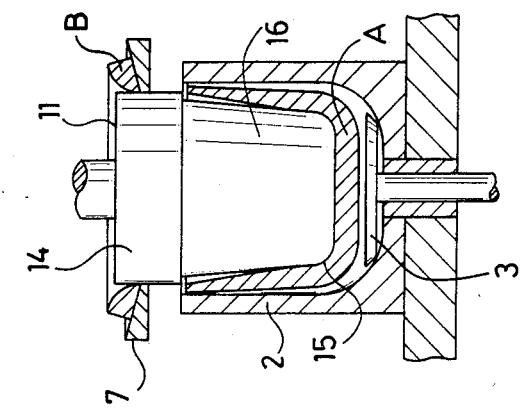
Figure 7:
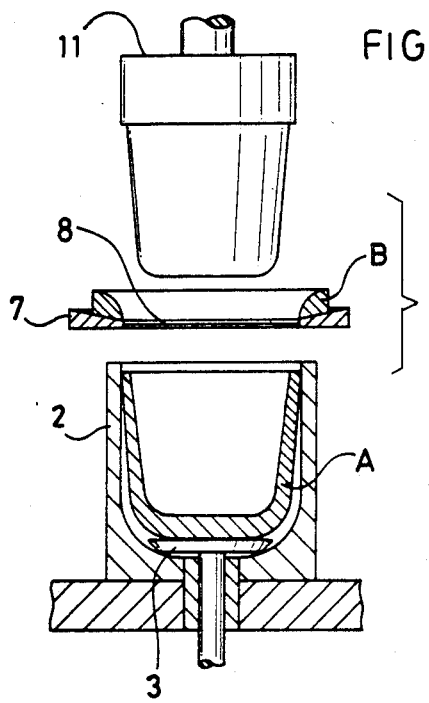

A flexible dough strip B having extensibility, which has a width slightly larger than the inner diameter of hole 8 and contains 45 and to 65 wt. %, preferably 50 to 60 wt. % of water based on a starch matericl, is placed on the plate 7 (FIG. 2). Then, the strip B is extruded downwardly from the hole 8 by means of the shaping part 16 of the shaping device 11 in the inverted conical or pyramidal form, thereby to prepare the cup-shaped skin A having a thickness gradient from a thick bottom to a thin top due to a gap difference between the hole 8 and the shaping part 16 and due to the extensibility of the dough strip B (FIGS. 3 and 4). Then, the cup-shaped skin A is cut apart by crossing the cutting edge 14 with the hole 8 (FIG. 5) and is placed on the lift plate 3 within the shaping cup 2 (FIGS. 6 and 7).

Figure 8:
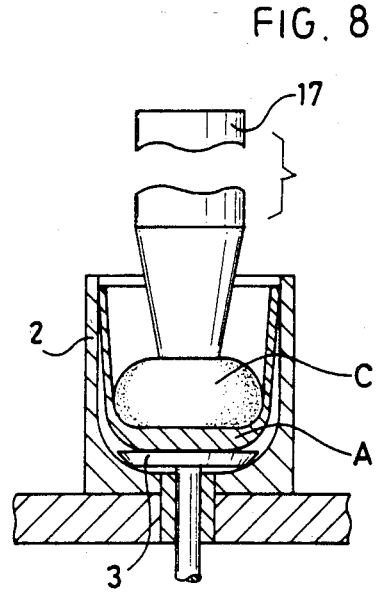
FIG. 8 is a vertical sectional view of the apparatus according to the invention, showing a procedure of filling cooked food into the cup-shaped skin.
Figure 9:
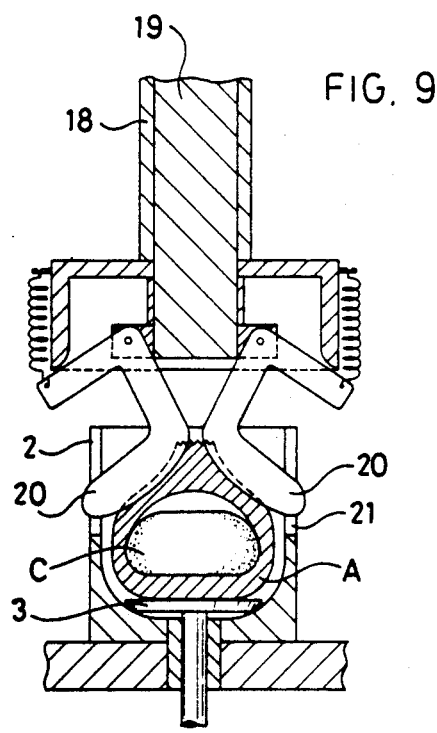
FIG. 9 is a vertical secitonal view of the apparatus, showing a procedure of closing the cup-shaped skin and providing a beautiful pattern, such as flowers, on the peripheral area of the envelope.
Figure 10:
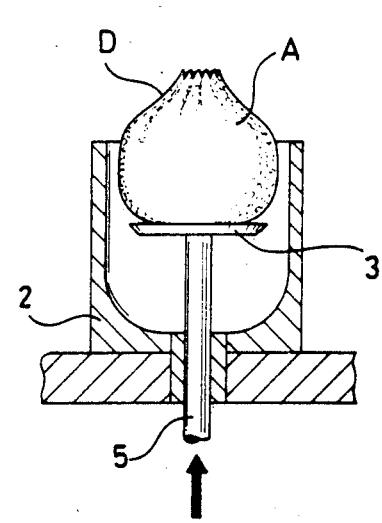
FIG. 10 is a vertical sectional view showing a procedure of removing the enveloped food from the shaping cup.

Within the cup-shaped skin A thus formed, as shown in FIG. 8, is filled cooked food C from upward by a filling device 17. Thereafter, the peripheral area of the skin A brought together is, as shown in FIG. 9, provided with a beautiful pattern, such as flowers, by a pattern-impressing device 18. Namely, a vertically movable rod 19 of the impressing device 18 at its lower periphery is provided with swingable arms 20 of a substantially U-shape. The arms 20 may be inserted into the shaping cup 2 through notched grooves 21 spaced apart in a suitable distance circumferentially on the upper periphery of the shaping cup 2. Finally, as shown in FIG. 10, the lift plate 3 in the shaping cup 2 is lifted to remove the finished food D thus enveloped.

Thus, in accordance with the invention, the flexible dough strip B having the predetermined width and extensibility, which has been placed on the plate 7, may be extruded downwardly from the hole 8 of the plate 7 by means of the lower shaping part 16 having the inverted conical or pyramidal form of the shaping device 11, thereby to form the cup-shaped skin A having the thickness gradient from the thick bottom to the thin top due to the gap difference between the hole 8 and the shaping part 16 (namely, the shaping part 16 is in the inverted conical or pyramidal form, so that the gap on the lower end side may be larger than that on the upper end side), and due to the extensibility of the dough strip B, which skin A thus formed is then cut apart by crossing the upper cutting edge 14 of the shaping device 11 with the hole 8 of the plate 7 and thereafter the cup-shaped skin A thus cut apart is placed onto the lift plate 3 within the shaping cup 2. In this way, the cup-shaped skin A for the enveloped food may be formed mechanically, so that the uniform cup-shaped skin A of high quality having flexibility and extensibility may be produced simply and rapidly in bulk.

Further, the cup-shaped skin A may have the thickness gradient from the thick bottom to the thin top, so that the successive operation of the filling device 17 and the pattern-providing device 18 may be possible. When the cup-shaped skin A at its upper periphery is brought together by the arms 20 of the pattern-providing device 18, its entirely uniform thickness may be achieved. Thus, the periphery brought together may be readily provided with the beautiful pattern, such as hand-made flower patterns, which may give good appearance of the enveloped food. Further, the periphery brought together may be readily and uniformly cooked due to its thin wall, resulting in better taste.

The plate 7 for placing the dough strip is tapered (about 10° angle) at its upper surface from the outer thick periphery to the inner area toward the hole 8, so that the dough strip B placed on the plate 7 may be moved smoothly toward the central hole 8 without damage and may be reliably cut apart by the outer edge 13 of the shaping device 11 in cooperation with the inner edge 9 of the plate 7. The thickness of about 2 mm of the inner edge 9 may prevent deformation and damage of the cup-shaped skin A at its upper circumference, while the arrangement of the tapered portion 10 under the inner periphery of the hole 8 may prevent deformation and damage of the cup-shaped skin A at its upper circumference due to a returning phenomenon of the elastic dough strip B.

The shaping part 16 of the shaping device 11 is provided at its lower periphery with the rounded portion 15, so that the skin A may be formed not only in the cup shape but also prevented from damage at its bottom corner during the shaping step. Further, the shaping part 16 is in the inverted conical or pyramidal form with the flat bottom face, so that the cup-shaped skin on its upper side may be thinly formed with its bottom being maintained at a predetermined thickness.

In addition, the surfaces of the shaping cup 2, the lift plate 3, the plate 7 for placing the dough strip B and the shaping device 11 are coated with Tefron, the dough strip B may be well released therefrom without adhesion, thereby to prevent deformation of the cup-shaped skin A.

As described hereinabove, in accordance with the invention, the soft cup-shaped skin of high quality having the extensibility with the thickness gradient from the thick bottom to the thin top may be readily and rapidly produced in bulk, while the beautiful pattern may be readily provided on the periphery of the cup-shaped skin, resulting in the good appearance. Further, the enveloped food thus prepared in accordance with the invention may be cooked uniformly for achieving the good taste.

What is claimed is:

1. A process for forming a cup-shaped skin for a skin-enveloped food, comprising the steps of:

placing on a plate having a hole a flexible dough strip having a predetermined width and thickness and an appropriate extensibility, extruding the dough strip downwardly through said hole of said plate by means of a lower shaping part having an inverted conical or pyrimidal shaping surface for the cup-shaped skin, said shaping surface and said hole being so designed that the difference between the diameter of said hole and the maximum diameter of said shaping surface is less than said predetermined thickness, whereby a cup-shaped skin having a thickness gradient gradually thinning from its bottom to top due to a gap difference between the hole and the shaping part and due to the extensibility of the dough strip is formed, cutting apart the cup-shaped skin by juxtaposing an upper edge of the shaping part with the hole of the plate, and placing the cup-shaped skin thus cut apart onto a lift plate within a shaping cup.

2. An apparatus of forming a cup-shaped skin for a skin-enveloped food, which comprises;

a shaping cup, a lift plate supported on a base of the shaping cup so as to be vertically movable, and a plate arranged above the shaping cup for supporting a dough strip of predetermined thickness, said plate having a center portion sloping inwardly and downwardly which portion is provided with a hole slightly smaller than an inner diameter of the shaping cup, and a shaping device for the cup-shaped skin arranged above the strip-supporting plate, comprising an upper cutting edge having an outer diameter slightly smaller than an inner diameter of the hole and a lower shaping part in an inverted conical or pyramidal form having an outer diameter at its upper end slightly smaller than the outer diameter of the cutting edge, said shaping part being vertically movable and being adapted to fit into the shaping cup through the hole of the strip-supporting plate, said hole and said lower shaping part being so designed that the difference between the diameter of said hole and the maximum diameter of said lower shaping part is less than said predetermined thickness.

* * * * *